July 21, 1931.  H. D. COLMAN  1,815,398
MOTOR CONTROL MECHANISM
Original Filed Feb. 5, 1927    3 Sheets-Sheet 1
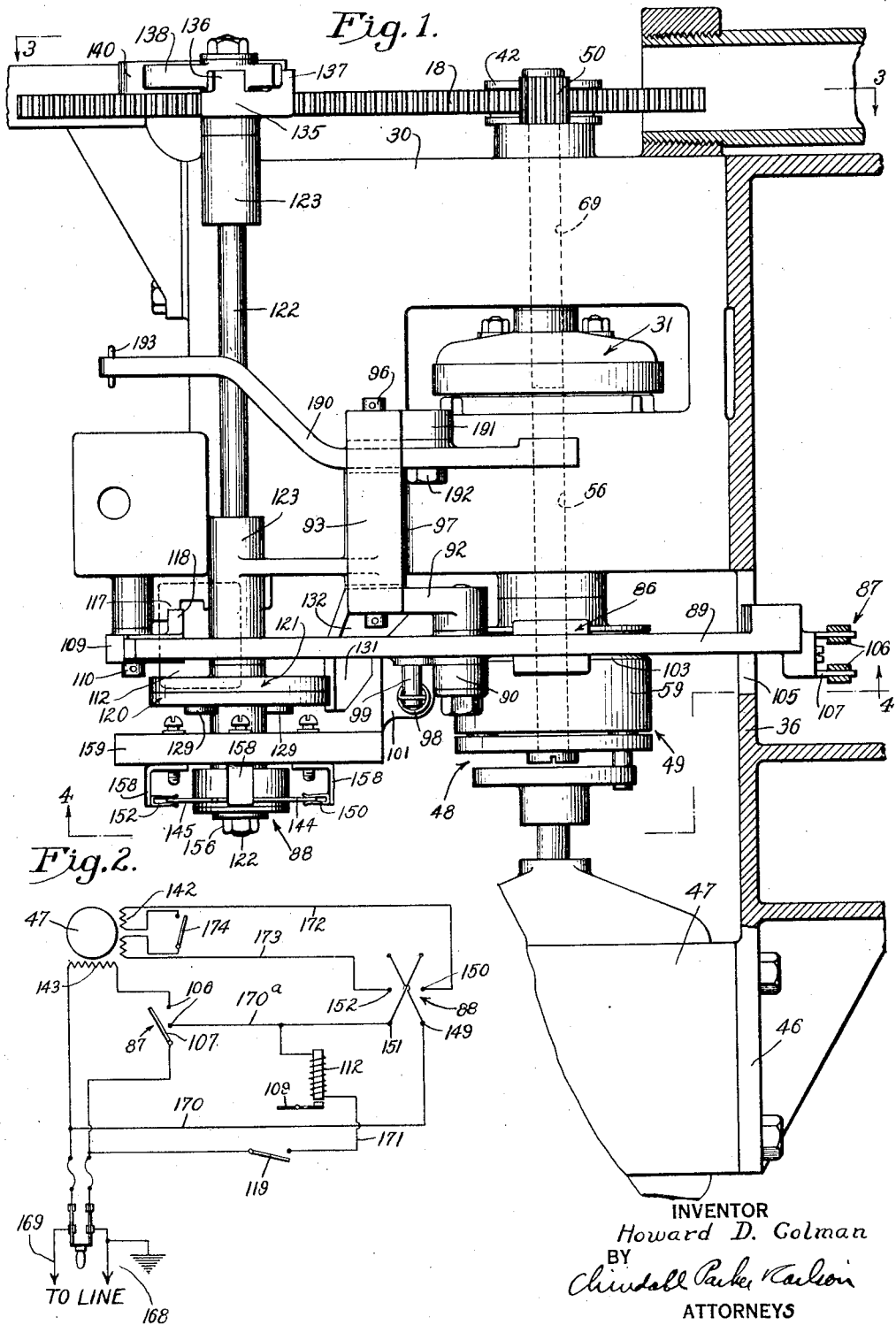
INVENTOR
Howard D. Colman
BY
Tindall Parker Carlson
ATTORNEYS

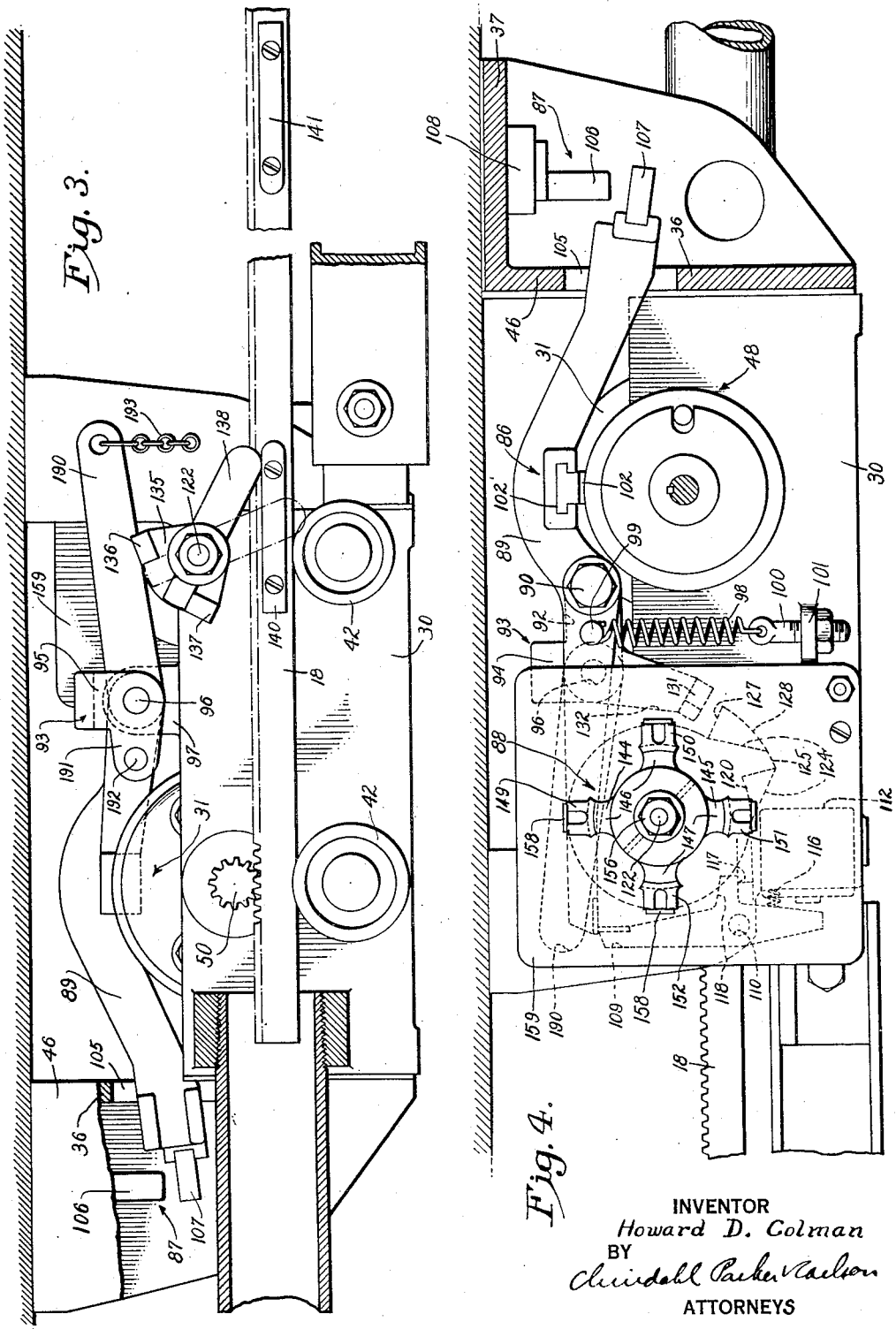

July 21, 1931.  H. D. COLMAN  1,815,398
MOTOR CONTROL MECHANISM
Original Filed Feb. 5, 1927    3 Sheets-Sheet 3

INVENTOR
Howard D. Colman
BY
ATTORNEYS

Patented July 21, 1931

1,815,398

UNITED STATES PATENT OFFICE

HOWARD D. COLMAN, OF ROCKFORD, ILLINOIS

MOTOR CONTROL MECHANISM

Original application filed February 5, 1927, Serial No. 166,086. Divided and this application filed June 8, 1928. Serial No. 283,802.

This invention relates to improvements in motor control mechanisms and more particularly to the control of an electric motor in a power driving unit of the character disclosed in my copending application Serial No. 166,086, filed February 5, 1927, of which this application is a division.

An important object of the invention is to provide a new and improved mechanism for controlling an electric motor for the execution of accurately defined operating cycles during which predetermined movements are imparted to the driven member.

Another object of the invention is to provide a novel motor control mechanism which is particularly adapted for use in conjunction with single phase induction motors of the split phase type for causing such motors to execute successive operating cycles of predetermined lengths alternately in opposite directions.

A further object is to provide a combined mechanism for accurately controlling the functioning of an electric motor and a brake therefor in the power driving unit for imparting predetermined movements to a driven member.

Still another object is to provide a novel mechanism operable for causing an electric motor to operate through predetermined cycles, said mechanism being controlled in the initiation of each of its successive cycles solely by the momentary energization of an electromagnet.

Other objects and advantages of the invention will become apparent from the following detailed description taken in connection with the accompanying drawings, in which—

Fig. 1 is a fragmentary view in plan section showing a power driving unit embodying the features of the present invention.

Fig. 2 is a wiring diagram illustrating the motor control circuits.

Figs. 3 and 4 are sectional views taken respectively along the lines 3—3 and 4—4 of Fig. 1.

Figure 5:
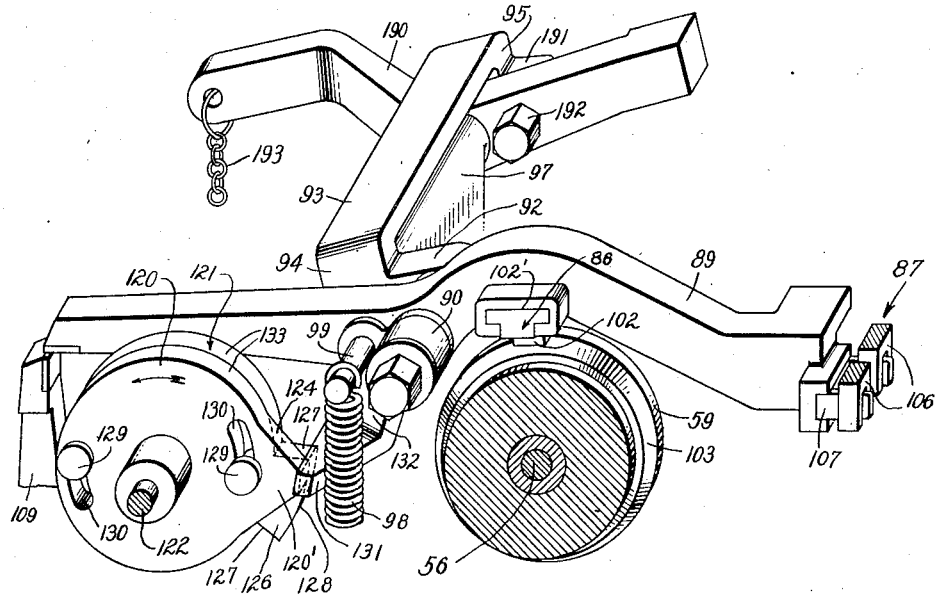
Figure 6:
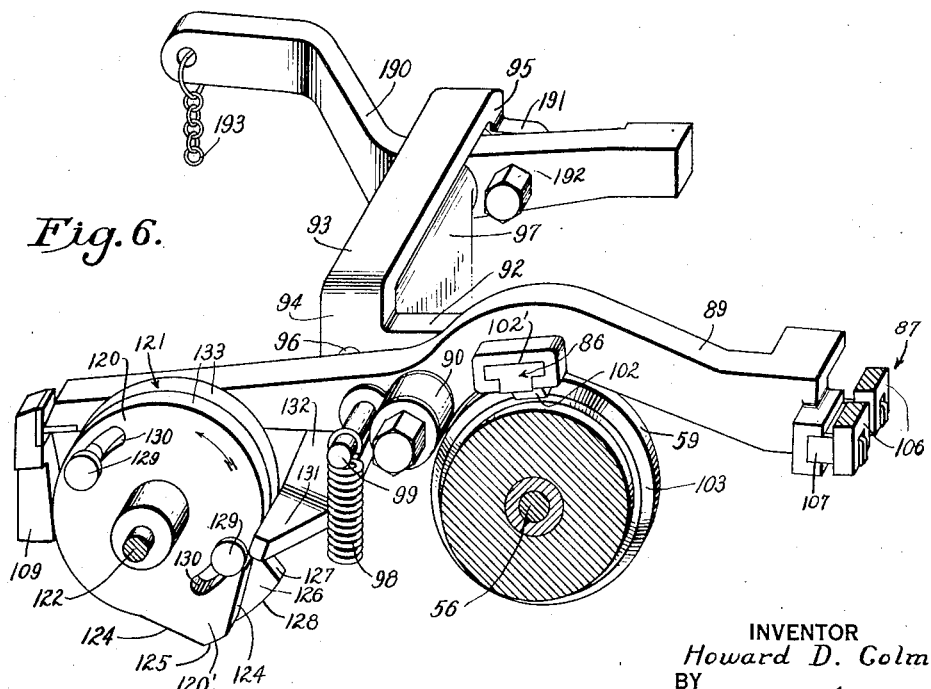

Figs. 5 and 6 are perspective views illustrating the parts of the motor control mechanism in different operating positions.

While I have shown in the drawings and will herein describe in detail the preferred embodiment of the invention, it is to be understood that I do not intend to be limited thereby to the particular form disclosed but aim to cover all modifications and alternative constructions falling within the spirit and scope of the invention as expressed in the appended claims.

In the exemplary form illustrated in the drawings, the invention is embodied in a power driving unit which may be utilized to impart successive opening and closing movements of predetermined length to a door or the like, the power being applied to the door through the medium of a driven member such as a reciprocatory rack bar 18. The power unit comprises generally a frame casting 30 upon an extension 46 on which is mounted a single phase induction motor 47 of the split phase type. Preferably the motor shaft is connected to the rack bar through the medium of a flexible coupling 48, a centrifugally operable clutch 49, and a speed reduction gearing 31 of the planetary type, a shaft 69 driven from the gearing being provided with a pinion 50 with which the rack bar 18 meshes. This relation is maintained by rollers 42 supporting the rack bar.

In the present instance, the unit is intended to move the rack bar 18 alternately in opposite directions in successive cycles of operation of the motor. The application of electric current to the motor and the application of the motive power to the rack bar 18 in each cycle is controlled by a brake 86 and main motor switch 87, and the direction of rotation of the motor is determined by the position of a reversing switch 88 (Figs. 2 and 4) associated with the motor field circuits. In the preferred embodiment, the brake and the motor switch are actuated substantially simultaneously, the brake always being applied when the motor switch is open, and vice versa.

A single control element in the form of a lever 89 is employed for effecting all of the necessary control movements of the motor switch and the brake. In the normal cycle of operation, the lever 89 is tripped from one set position and moves in a direction to release the brake and to close the motor switch, thereby starting the motor in a direction determined by the position of the reversing switch. Near the end of the operating cycle, the lever is moved automatically into a second set position. Finally, the lever is tripped from the second set position and, in its movement to its first set position, opens the motor switch and applies the brake to stop the motor. These various functions are accomplished by providing a floating mounting for the control lever, which permits of pivotal movement of the lever about a plurality of different fulcrum points to effect the different movements above described in proper sequence.

Referring now more in detail to the construction of the control mechanism, the lever 89 is shown as comprising a bar having a curved portion intermediate its ends and mounted to swing in a vertical plane. To this end, the bar is pivoted adjacent said curved portion on a shoulder stud 90 threading into the end of an arm 92 integrally formed on and projecting rearwardly from a rocker member 93. The member 93 is in the form of a yoke having depending legs 94 and 95 at its ends which are pivoted on a supporting pin 96. This pin extends parallel to the stud 90 and is mounted in a lug 97 upstanding from the top plate of the frame casting. Thus the lever 89 is mounted eccentrically of the axis of the yoke member for bodily movement relative to this axis and is also adapted to swing about the axis provided by the stud 90.

A tension spring 98 acting downwardly on the lever 89 at a point between the pin 96 of the yoke member 93 and the axis of the stud 90, normally tends to swing the rear end of the lever upwardly about the stud 90 as a pivotal center and the arm 92 of the yoke member downwardly about the pin 96. At its upper end, the spring 98 is attached to a pin 99 on the lever 89 and at its lower end to an adjusting bolt 100 held by a lug 101 on the frame. Since the spring acts eccentrically of the stud 90 and also of the pin 96, it is capable of swinging the member 93 and the lever 89 jointly about the fixed axis or of swinging the lever only about the shiftable axis defined by the rocker member.

The brake illustrated herein comprises a block 102 of friction material such as wood mounted on the lever 89 in position to work in a peripheral groove 103 in a drum 59 which constitutes the driven member of the centrifugal clutch 49 above referred to and which is connected to the driven shaft 69 by a shaft 56 and the speed reduction gearing 31. To utilize the force of the spring 98 efficiently for stopping the doors, the groove 103 is formed with inclined sides which cooperate with the bevelled edges of the block 102 to increase the normal pressure between the brake surfaces. The T-shaped portion of the block 102 fits removably in a slot 102' in the lever 89 so that the block alines itself automatically with the groove 103. As will appear later, engagement between the drum 59 and the block 102 serves to limit the downward swing of the control lever 89. The full force of the spring 98 is therefore utilized in pressing the block 102 into the groove 103.

Herein the main motor switch 87 is located at the rear end of the lever 89 which projects through an opening 105 in the wall 36 of the frame member. This switch comprises a pair of electrically connected blades which make contact between two pairs of insulated contact terminals 106 when the rear end of the lever 89 is swung upwardly. The blades constitute the legs of a U-shaped member 107 which is rigidly mounted in a transverse slot in the rear end of the lever 89. The terminals 106 are secured to an insulating block 108 mounted on the underside of the horizontal ledge 37.

Means is provided for holding the lever 89 in a set position whenever the motor is idle so that it may be released under manual control to initiate operation of the motor. This means comprises a latch 109 adapted to swing into the path of the end of the lever 89 opposite the motor switch and thereby support this end of the lever in raised position against the action of the spring 98 which tends to hold the lever against the brake drum 59 about the end of the latch as a pivotal center. This relation is shown in dotted outline in Fig. 4. The latch 109 is disposed in the plane of the lever 89 and is pivoted intermediate its ends on a pin 110 carried by the frame 30.

As a means for tripping the control lever to initiate a cycle of operation, an electromagnetic coil 112 is arranged when energized to act on the lower end of the latch lever 109 as an armature. This coil is supported on the frame 30 through the medium of its core member. A compression spring 116 (Fig. 4) serves to press the upper end of the latch against the end of the lever or into latching position beneath the lever, the latter movement being limited by a stop 117 positioned to engage an arm 118 on the latch (see Fig. 4).

It will be apparent that when the latch is withdrawn by an energization of the coil 112, the control lever will, provided the stud 90 is stationary, swing about the stud 90 under the action of the spring 98, thereby moving from the position shown in Fig. 4 to the position shown in Fig. 6. In thus pivoting about the stud, the brake will be released and the motor switch will be closed simultaneously. This will start the motor to reciprocate the rack bar 18.

The electromagnetic coil 112 may be energized to initiate an operating cycle from any appropriate control means, such, for example, as by a hand switch 119 (see Fig. 2) connected in series with the coil 112 and a source of current.

Near the end of each operating cycle the lever 89 is actuated automatically against the action of the spring 98 to reset the latch 109 for the succeeding cycle of operation and simultaneously to condition or reset the lever for subsequent release from a second set position in the same cycle by another tripping means to open the switch and apply the brake with a snap action. In other words, the lever is operated so as not only to terminate the instant cycle automatically but to leave the control lever conditioned for proper operation in the succeeding cycle.

The means for thus conditioning the lever 89 is, in the preferred embodiment, in the form of a cam device comprising two disks 120 and 121 carried by a cam shaft 122 which extends parallel to the axis of the yoke member 93, the shaft being journaled in lugs 123 on the frame 30.

The disk 120 is fixed to the cam shaft 122 at a point beyond the lever 89 and is formed with a lobe 120' having inclined surfaces 124 at the ends of a relatively short circumferential surface 125. The disk 121 is loose on the shaft 122 adjacent the disk 120 and is formed with a lobe 126 having abrupt or radially extending surfaces 127 at the ends of a circumferential surface 128 of substantially the same radius of curvature as the surface 125. On the disk 121 are pins 129 which project through slots 130 in the disk 120 so as to allow for limited rotational movement of the lobe 126 relative to the lobe 120'.

In the angular movement of the shaft 122 in either direction, the two lobes act as a single cam which works against a follower comprising an extension 131 projecting laterally from an arm 132, the latter being integrally formed on the leg 94 of the yoke member 93. Normally the follower is positioned so as to clear the dwell surfaces 133 of the cam disks when, as shown in Fig. 4, the brake drum 59 is acting as a stop for the control lever 89 and thereby limiting the swing of the yoke member 93 by the spring 98. Thus, the full effect of the spring 98 is used for braking. However, when the latch 109 is withdrawn as above described, the follower moves into engagement with the dwell surfaces 133 of the cam disks to limit the downward swing of the stud 90. The latter now provides a fixed pivot on which, during the initial control movement, the control lever 89 turns by the action of the spring 98 to lift the brake member and close the motor switch.

The cam device actuates the yoke member 93 as follows when the cam shaft 122 is oscillated in either direction near the end of the operating stroke of the rack bar 18: In the rotation of the cam shaft counter-clockwise from the position shown in Fig. 6, the follower arm 131 first strikes the leading abrupt surface 127 as shown in Fig. 4, thereby holding the disk 121 back until the pins 129 reach the remote ends of the slots 130 (see Fig. 5). Thus the surfaces 127 are shifted relative to the surfaces 124. During this shifting movement the leading inclined surface 124 of the lobe 120' engages the follower arm 131 and moves it rearwardly thereby oscillating the yoke member 93 to swing its arm 92 upwardly as shown in Fig. 5. The follower arm 131 then rides along the arcuate surface 128 which holds the yoke member momentarily in its actuated position and the lever 89 is in its second set position. When the abrupt trailing surface 127 is carried beyond the follower arm, the arm 92 snaps downwardly under the action of the spring 98.

The movements of the control lever 89 resulting from such actuation of the yoke member 93 will now be described, it being assumed that the parts are in the position shown in Fig. 6 with the motor switch in closed position, the brake released, and the spring 98 tending to swing the lever about a fulcrum at the end of the lever opposite the latch, which fulcrum may be defined by stationary means such as the fixed switch contacts which also constitute means for limiting the movement of the lever upon withdrawal of the latch 109. The cam dwell portions 133 acting through the medium of the rocker member 93 serves to limit the downward movement of the latch end of the lever by the spring and therefore define a limiting position for the pivot stud 90. Now, when the arm 92 of the yoke member is raised by the action of the inclined leading surface of the cam device, the stud 90 is carried upwardly and in its movement swings the control lever 89 upwardly against the action of the spring 98 and about the switch blades as a fulcrum, thereby extending the spring 98. In this single operation the lever 89 will be positioned so that it may be released by either of its two tripping members which are the latch 109 and the trailing portion of the cam device. As the lever is swung upwardly, its forward end cams the latch 109 outwardly, and the latch finally moves in under the end of the lever to hold that end in raised position. At this time the lever will be held in a second set position by the circumferential portion 128 of the cam lobe 126 but this position is maintained only momentarily owing to the fact that the cam device is moving rapidly.

Then, when the abrupt trailing surface 127 of the cam device passes the follower arm 131, the lever will be released from its second set position since the supporting stud will thereby be permitted to move downwardly under the action of the spring 98. In this downward movement, the control lever pivots about the end of the latch 109 and thereby opens the switch 87 and applies the brake with a quick snap action. Thus, the cycle of operation will be terminated leaving the lever latched up so that it can be tripped under manual control through the medium of the magnet 112 at the beginning of the next cycle.

It will be observed that in a complete cycle of operation, the control lever 89 fulcrums about three different points; first, when released by withdrawal of its first tripping member, the latch 109, the lever fulcrums intermediate its ends about the stud 90 and therefore functions as a lever of the first class; second, in the resetting movement, the fulcrum is located at the switch blades on the opposite end of the lever, it being then a lever of the third class; and third, when released by withdrawal of its second tripping member, the cam lobe 126, the lever swings about its forward end as a pivot center as it is then a lever of the third class. By shifting the pivotal center to the rear end of the lever during the resetting operation, movement of the lever is permitted without disturbing the motor switch, which must remain closed until the end of the cycle. By pivoting the lever about the latch 109 during the stopping operation, the setting of the latch is not disturbed during the opening of the switch and everything is left in proper condition for the next operating cycle.

Means is provided for oscillating the cam shaft 122 near the end of each operating cycle to operate the cam device, this being done in the present instance through the medium of a lost motion connection with the driven shaft 69. To provide such a connection, a crank arm in the form of a segment 135, (Fig. 3) is fixed to the cam shaft above the rack bar 18 and is provided with spaced lugs 136 and 137. A lever 138 is loosely mounted intermediate its ends on the cam shaft 122 with its short upper end positioned between the lugs 136 and 137. The lower weighted end of the lever projects into the path of two cam blocks 140 and 141 secured against the outer side of the rack bar 18 near the opposite ends thereof. In the forward position of the rack bar 18, the cam shaft 122 will be positioned as shown in Fig. 3 with the lever 138 raised by the cam block 140.

When the rack bar moves rearwardly on the other operating cycle, the block 140 will pass from under the lever 138 and the latter will fall downwardly, as shown in dotted outline in Fig. 3, such movement being permitted by the lost motion provided between the lugs 136 and 137 and the lever 138. Then, at the end of this cycle, the cam block 141 will strike the lever 138 and will swing its upper end to move the lug 136. This oscillates the cam shaft 122 through about 90°, during which oscillation the control lever is actuated as above described. The lever 138 is operated in the reverse manner, during the cycle of operation of the driving unit which moves the rack bar in the opposite or forward direction.

It will be apparent that the stopping of the motor and therefore the length of operating cycle of the operator is determined by the position of the cam blocks 140 and 141 on the rack bar 18. Thus, the length of the cycles may be varied to suit any given operating conditions.

The construction of the resetting cam permits the mechanism as a whole to be adapted to the actuation of parts which move at widely varying speeds. When the part to be actuated moves at a low speed, the provision of the loose cam 126 to define the trailing cam surface enables the desired quick opening of the motor switch to be obtained. On the other hand, when the part moves at a sufficiently high speed, the cam 126 may be omitted, the motor switch then being opened as the trailing surface 124 passes the follower arm 130. In such a case the surface 124, together with the circumferential surface 125, constitutes the tripping device which, as above described, acts momentarily to support the lever in its second set position and then releases the lever for movement in a direction to stop the motor.

The reversing switch 88 (Figs. 2 and 4) is arranged to be actuated in the present instance by the same means, that is the shaft 122, which conditions the control lever 89 for release from its two set positions, and the effect of such actuation is to condition the motor circuit connections so that the motor will, when started, rotate in a direction reverse to that in which it rotated in the preceding cycle. This is accomplished by reversing the connections for the starting field 142 (see Fig. 2) of the motor relative to the main motor field 143 while the starting field is not in use, that is, while the reversing switch is not carrying current.

The switch 88 shown herein, is of well known construction and its movable element is located on the end of the cam shaft 122 beyond the cam disk 120. In the form illustrated, the movable element of the switch includes two connecting plates 144 and 145 (Fig. 4) the former having two contact arms 146 and the latter having arms 147 which are adapted to engage between spring contacts 149, 150, 151 and 152. The plates 144 and 145 are clamped by a bolt 156 between insulating disks on the shaft 122 and are insulated from one another and from the shaft 122.

The spring contacts 149, 150, 151 and 152 (see Fig. 4) project radially inward from their supporting members 158 in position to receive the contact arms of the plates 144 and 145 between them when the cam shaft is oscillated in either direction. The supporting members 158 are L-shaped in form and are secured against the outer face of an insulating block 159. The angular position of the plates 144 and 145 on the shaft 122 is such that when the rack bar 18 is in its forward position, the cam shaft 122 will be positioned as shown in Fig. 4 with the plate 144 connecting contacts 149 and 150 and the plate 145 connecting contacts 151 and 152. Now, if the cam shaft is oscillated to its other position, the plate 144 will move to make contact between contacts 149 and 152 while the plate 145 will connect contacts 150 and 151.

The motor control circuits will now be explained and traced in relation to the operation of the driving unit during one operating cycle. Referring to the wiring diagram shown in Fig. 2, the grounded power line 168 of a source of alternating current is connected to the movable member 107 of the main motor switch while the other power line 169 is connected to one terminal 106 of the motor switch through the main field 143 of the motor. The power line 169 is also connected through a conductor 170 to the contact 149 of the reversing switch. The reversing switch contact 151 is connected by a conductor 170ª to the other terminal 106 of the motor switch. A shunt circuit 171 extends from the conductor 170ª to the grounded line 168 through the tripping magnet coil 112 and the manual control switch 119. Conductors 172 and 173 connect opposite ends of the starting field 142 of the motor to the reversing switch contacts 150 and 152. The motor is provided with the usual centrifugal switch 174 in series with the field 142. This switch is closed when the motor is at rest and is held open by centrifugal action when the rotor of the motor is rotating so that after the motor has attained a predetermined speed the starting field will be cut out automatically.

*The operation*

The operation of the motor control mechanism is as follows, assuming the parts to be positioned to correspond to the forward position of the rack bar 18 as shown in Figs. 1, 3 and 4. Under these conditions, the contacts 149 and 152 of the reversing switch are connected with contacts 150 and 151 respectively by the connecting plates 144 and 145. When the control switch 119 is closed, the magnet coil 112 will be energized through the circuit leading from the line 168 through the shunt conductor 171, contacts 151 and 152, conductor 173, field 142, switch 174 which is then closed, conductor 172, contacts 150 and 149, conductor 170 to the power line 169. Such energization of the magnet trips the latch 109 which permits the lever 89 to pivot about the stud 90 thereby releasing the brake and closing the motor switch 87.

Closure of the motor switch completes a circuit through the main field 143 and also completes a circuit through the starting field 142 as follows; from the power line 168, switch member 107, terminal 106 of the motor switch, conductor 170ª, contacts 151 and 152 of the reversing switch, conductor 173, field 142, switch 174 which is still closed, conductor 172, contacts 150 and 149, conductor 170 to the power line 169. Thus, the motor is started in a direction to move the rack bar 18 rearwardly. When normal speed and torque have been attained, the switch 174 is thrown open by centrifugal action. Thereafter, the field 143 is maintained energized until the circuit is broken by the opening of switch 87.

As the rack bar approaches the rearward limit of its travel, the cam shaft 122 will be oscillated by the cam block 141 and the members 146 and 147 of the reversing switch will be moved to connect contacts 149 and 152 and contacts 150 and 151. Such reversal of the starting field connections will not change the direction of the rotation of the induction motor because, in the present instance, energization of the starting field while the motor is running is prevented by the centrifugal switch 174 which is always open when the motor is running. Simultaneously with the operation of the reversing switch the cam device operates to swing the lever 89 about the motor switch 87 thereby resetting the lever for the next cycle of operation. When the cam follower arm 131 is released by the cam disk 121 and the lever 89 pivots about the latch 109 as a fulcrum, the motor switch is opened and the brake is applied. Thus, the motor stops because there is no current flowing in either of its fields.

In the other cycle of operation the above mentioned functions are repeated except that the current flow through the starting field 174 is reversed owing to the position of the reversing switch connecting plates which causes the motor to rotate in the opposite direction. In all other respects, the cycle is the same as the cycle just described.

It is to be noted that inasmuch as the tripping magnet 112 is in series with the centrifugal switch 174, the former cannot be energized except when the motor is at rest or substantially so. Therefore, the motor must slow down sufficiently to close the switch 174 before the lever 89 can be tripped again to close the motor switch. This safeguard effectually prevents continued operation of the motor which might otherwise take place if it were possible to energize the magnet 112 by holding the control switch 119 closed or by closing it after the control lever 89 has been reset, thereby preventing engagement between the latch 109 and the control lever 89.

Means is provided by which the control lever can be operated by hand to stop the motor and condition the mechanism for operation in another cycle. This means comprises a lever 190 pivoted on the pin 96 adjacent the yoke leg 95 and pivotally connected to an arm 191 by a stud 192. To the other end of the lever is attached a pull cord 193 by which the lever can be actuated. By pulling on the cord, the arms of the yoke member 93 are swung upwardly in the same manner as when the member is actuated by the cam disks 120 and 121. Thus, the lever 89 is reset with respect to the latch 109. Then when the cord 192 is released, the spring 98 swings the yoke member and the lever 89 in a direction to apply the brake and open the motor switch.

The mechanism thus provided is extremely simple in construction but capable of performing a large number of functions, all of which follow automatically from the momentary energization of the magnet 112. Such advantageous control of the successive operating cycles by a relatively small electromagnet is made possible through the use of a releasable control element which is set by the motor in one cycle and actuated by the energy thus stored in the spring 98 upon energization of the magnet to initiate the next cycle.

The arrangement employed for opening the motor switch and applying the brake enables the operated part always to be arrested in an accurately defined position and with minimum danger of excessively burdening any of the switch contacts. In the case of the reversing switch, the circuit therefor is open when the position of its movable element is shifted. The main motor switch is opened with a quick action without relying on the momentum of the driven parts of the operator to insure that the contacts will be carried completely out of engaging relation. Thus, in the present instance opening of the main switch to terminate the cycle is effected by release of the control lever from a set position and the energy for actuating the switch is stored in the spring 98 so that it can be utilized after the initial opening of the switch to complete the fixed movement of separation between the cooperating contacts independently of the motion of the driven parts. The life of the switch is therefore prolonged indefinitely.

Successive cycles of the power operator are, it will be noted, initiated by closure of the single switch 87 which takes place under the control of a manually operable device, namely the movable contact element of the switch 119, which is moved in the same direction to initiate each cycle. With this arrangement, the number of switches and control circuits required is reduced to a minimum.

I claim as my invention:

1. A motor control mechanism having, in combination with a part to be operated in successive cycles of predetermined length, a motor operatively connected with said part, a control device having two set positions, a tripping member for holding said device in one of said positions and withdrawable under manual control to start said motor, a second tripping member operable to hold said device in its other set position, and means operated as an incident to the movement of said part by said motor for withdrawing said last mentioned tripping member to stop said motor.

2. A motor control mechanism, having in combination with a part to be operated in successive cycles of predetermined length, a motor having a driving connection with said part, a releasable control device having two set positions, two independently operable tripping means for holding said device in said positions and respectively operable to release the device for movement from its two positions, mechanism for starting and stopping said motor arranged to be actuated in the movement of said device from one of said positions to start the motor and to be actuated in the movement of said device from said other set position to stop the motor, and a single means operable in the movement of said part by said motor for conditioning said device for operation by each of said tripping means.

3. A motor control mechanism having, in combination with an electric motor and a part to be operated thereby through a predetermined cycle, a releasable control device having two set positions, mechanism for starting and stopping said motor arranged to be operated in the movement of said device from one of said positions to initiate a cycle of operation of said motor and to be operated in the movement of said device from said other set position whereby to terminate said cycle, and means actuated by power derived from the operation of said motor to condition said device for operation from each of said positions and then to release said device to stop the motor.

4. A motor control mechanism having, in combination with an electric motor and a part to be operated thereby through a predetermined cycle, a control element having two set positions and arranged to be released from one set position to start the motor and from the other position to stop the motor, spring means tending to move said element from each of said positions, cam means operable in the movement of said part and adapted in a single operation to reset said element for movement from each of said positions in predetermined sequence.

5. A motor control mechanism having, in combination with an electric motor and a part to be operated thereby through a predetermined cycle, releasable means controlling the starting and stopping of said motor during one cycle of operation, a latch for tripping said releasable means to initiate operation of said motor, and means operable automatically by power derived from the motor to move said releasable means in one direction and thereby reset said latch for the succeeding cycle and then to release said means and permit movement thereof in the opposite direction whereby to stop the motor and terminate the cycle.

6. A control mechanism having, in combination with an electric motor, a switch therefor, actuating means for said switch including a pivotal member normally held in set position and having an operative connection with a movable part of said switch, means for releasing said member for movement about one fulcrum point to close said switch and thereby initiate one cycle of operation of said motor, and means actuated by power derived from the motor for conditioning said member for operation in the succeeding cycle without opening said switch, including an element adapted when actuated to swing said member about a pivot center located adjacent the point of connection between said switch and said member.

7. A control mechanism having, in combination with an electric motor, a control lever, a switch for said motor adapted to be opened and closed by different movements of said lever, a latch member adapted when in released position to permit said lever to swing on one pivotal center into switch closing position, said latch when in set position providing a second pivotal center for movement of said lever to open said switch, and means deriving power from said motor for moving said lever into position for engagement by said latch in its set position.

8. A power operator having, in combination, an electric motor, mechanism adapted to be driven by said motor, a pivotal control lever, a movable switch element on said lever adapted to be moved into switch-closing position in the movement of said lever about one pivot center whereby to start said motor and to be moved into switch-open position in another movement of said lever about a second pivot center whereby to stop said motor, means operatively associated with said mechanism to turn said lever about its second pivot, a brake for said mechanism adapted to be released in the movement of said lever to switch-closing position and to be set in the movement of said lever to switch-open position and actuating means for said lever.

9. A motor control mechanism for power driven operators comprising, in combination with a part to be moved by said operator through successive cycles, an electric motor connected with said part, a switch for controlling the supply of energy to the motor, and means for operating said switch including a control lever, a trip device normally supporting the lever in position to hold the switch open and releasable to permit movement of the lever to close said switch, and a cam device operable in each cycle of said operator first to restore said lever to the support of said tripping device and then to effect movement of the lever to open said switch.

10. A motor control mechanism for power driven operators comprising, in combination with a part to be moved by said operator through successive cycles, an electric motor connected with said part, a switch for controlling the supply of energy to the motor, and means for operating said switch including a control lever, means providing a shiftable pivot for supporting said lever between its ends, a latch normally supporting one end of said lever and releasable to permit movement of the lever about said pivot whereby to close said switch, means operable in each cycle of movement of said part to shift said pivot while the switch remains closed, said latch operating in the shifting of said pivot to re-engage the lever, said pivot shifting means being operable after the re-engagement of said latch to permit movement of the lever in a direction to open said switch and terminate the operating cycle.

11. A motor control mechanism for power driven operators comprising, in combination with a part to be actuated through successive operating cycles, an electric motor having a driving shaft connected with said part, a friction braking surface movable in the rotation of said shaft, a lever carrying a brake shoe arranged for engagement with said surface, means providing a shiftable pivot upon which the lever is mounted intermediate its ends, spring means tending to move said lever in a direction to apply said shoe to said surface, a latch for supporting the end of the lever opposite said shoe, said latch being releasable to permit movement of said lever about said pivot so as to remove the shoe from said surface, means acting as an incident to the movement of said part by said motor first to shift said pivot to permit the re-engagement of the latch with said lever and then to permit the return movement of the pivot to cause the re-engagement of the shoe with the drum, and a switch controlling the supply of electrical energy to said motor and arranged to be closed by said lever in the initial tripping of said latch and opened by said lever coincident with the application of said brake.

12. A motor control mechanism having, in combination with a part to be moved in opposite directions in successive cycles of predetermined length, an electric induction motor having main and starting windings, a main switch for controlling the application of alternating current to said windings to start said motor, a reversing switch associated with the starting winding for determining the direction of rotation of said motor, a switch in series with the starting winding and adapted to be opened automatically after the motor has started, and means operating as an incident to the movement of said part in each cycle and while the last mentioned switch is open to operate said reversing switch.

13. A power driven operator comprising, in combination, an actuating member adapted to be connected with a part to be moved alternately in opposite directions, an electric reversible motor having a driving connection with said actuating member, a rock shaft operatively associated with said member so as to be turned in one direction or the other as the said member approaches either limit of its movement, a reversing switch operable to control the direction of rotation of the motor and adapted to be actuated by said rock shaft, a second switch for controlling the energization of the motor to operate it in a direction determined by the position of said reversing switch, and a control lever for operating the second switch, spring means tending to move said lever in one direction, and two devices for releasing said lever to the connection of said spring, one being operable to permit movement of the lever from a normal set position to close the said second switch and the other being operable by said rock shaft at the end of each operating cycle to effect the opening of said second switch, the first mentioned device being adapted to re-engage said lever as an incident to the movement of the rock shaft in either direction, and the second device being effective only upon such re-engagement of the first device.

14. In a power driven operator, the combination of an actuating member to be moved in opposite directions in successive cycles of said operator, an electric reversible motor having a driving connection with said actuating member, an element operatively associated with said member so as to be operated in timed relation thereto as the member approaches either limit of its movement, a reversing switch operable to control the direction of rotation of the motor and adapted to be actuated by said element, a second switch for controlling the energization of the motor to operate it in a direction determined by the reversing switch, and a control lever for operating the second switch, said control lever having means tending to move it in one direction, and two trip devices, one of said trip devices comprising a latch normally operating upon said lever to maintain said second switch open and releasable to effect closure thereof, and the other trip device being controlled by said element and operable at the end of either cycle to effect the opening of said switch with a snap action, said lever being mounted to turn on a movable fulcrum adapted to permit resetting of the lever in operative association with said latch prior to the opening of the second switch.

15. A power driven operator comprising, in combination with a part to be moved in opposite directions in successive cycles, a rock shaft adapted to be turned in one direction or the other as an incident to the movement of said part in either direction, an electric reversible motor having an operative connection with said part, a reversing switch operable by said rock shaft at the end of each cycle of said operator to determine the direction of rotation of the motor in the next operating cycle, a switch controlling the supply of energy to said motor, and a lever for operating said control switch, said lever being mounted on a movable fulcrum and having means tending to move it, a latch normally holding said lever in a position in which the control switch is open, said lever being operable upon release of said latch to close said control switch, and a cam device operable by said rock shaft as said part approaches the end of its movement in either direction, said cam device acting first to re-engage the lever with said latch and then to effect movement of the lever to open the control switch, and a brake releasable by said lever in the act of closing the control switch and applied by the lever in the act of opening the control switch.

16. The combination with an electric motor and a part to be actuated thereby through successive operating cycles, of a control element releasable from two different set positions to initiate and terminate the operation of the motor in each of said cycles, electromagnetic means for effecting release of said element from one position to start the motor, means deriving power from the motor for effecting release of said element from said other position to stop the motor, and means also deriving power from said motor during each of said cycles for resetting said element for release from each of said positions.

17. The combination with an electric motor and a part to be actuated in successive cycles alternately in opposite directions, of a switch for said motor, a lever for actuating said switch, a latch holding said lever in a set position at the beginning of each cycle and withdrawable to release the lever for movement in a direction to close said switch, and a cam adapted to be moved in opposite directions by said motor near the ends of successive cycles, a follower, said cam presenting an inclined leading surface and an abrupt trailing surface to said follower regardless of the direction of motion of said part, said surfaces acting through the medium of said follower first to reset said lever relative to said latch and then release the lever for movement to switch-opening position with a snap action.

18. A control mechanism for defining successive operating cycles of an electric motor comprising, in combination, an elongated lever, a member mounted for movement transversely of said lever and providing a pivot for said lever intermediate the ends of the latter, a spring acting on said lever at a point adjacent said pivot thereby tending to swing said lever and also to shift said member, means to limit the movement of said member by said spring, a latch associated with the same end portion of said lever as said spring and withdrawable to release the lever for movement about said pivot, stationary means associated with the end portion of the lever remote from said latch and acting to limit the movement of such end upon withdrawal of said latch and to provide a second fulcrum for the lever, means operable to move said member away from its limiting position whereby to swing said lever about said second fulcrum and thereby reset said latch, means operating subsequent to such resetting to release said member for reverse movement and thereby permit said spring to swing the lever away from said stationary means and about a third fulcrum defined by said latch, means operated automatically by the motor for actuating said two last mentioned means, and a switch controlling said motor associated with said remote end portion of said lever and adapted to be opened and closed in the pivoting of said lever about said first and third fulcrums respectively.

19. A control mechanism for defining successive operating cycles of an electric motor comprising, in combination, a member providing a bodily shiftable pivot, a lever mounted intermediate its ends to swing on said pivot, spring means normally tending to swing said lever about said pivot and also to shift said member, means to limit the movement of said member by said spring means, a latch adapted to support one end of said lever and when withdrawn to release said lever for movement about said pivot, the latter being then fixed by said limiting means, stationary means acting to limit the movement of the opposite end portion of said lever following withdrawal of said latch, means driven by said motor for moving said member out of limiting position and then releasing the member for movement by the spring means, said lever in said first mentioned movement of the said member being swung about said stationary means as a fulcrum to reset said latch, said lever upon release of said member being swung away from said stationary means about said latch as a fulcrum, and control means for said motor associated with the end portion of said lever opposite said latch and acting to start the motor in the motion of said lever caused by withdrawal of the latch and to stop the motor in the movement of said lever about said latch as a fulcrum.

20. The combination with an electric motor of means providing a pivot which is shiftable toward and from a limiting position, a lever mounted intermediate its ends to swing on said pivot, means tending to swing said lever about said pivot and also to move the pivot into said position, a latch associated with one end portion of said lever and adapted to releasably hold the same in a set position but withdrawable to permit the lever to swing about said pivot while the latter is in said limiting position, means actuated by the motor for effecting movement of said pivot first away from said limiting position and then toward such position, the movement away from limiting position causing the latch end of the lever to reengage said latch by swinging about a fulcrum associated with the remote end portion of the lever, said latch after thus being reset providing a fulcrum for movement of said pivot toward its limiting position, and control means for said motor arranged to be actuated by the lever from a point adjacent said remote end to initiate an operating cycle in response to withdrawal of said latch and terminate such cycle in the swinging of said lever about the latch.

21. The combination with an electric motor of means providing a pivot which is shiftable toward and from a limiting position, a lever mounted intermediate its ends to swing on said pivot, spring means tending to swing said lever about said pivot and also to move the pivot into said position, a latch associated with one end portion of said lever and adapted to releasably hold the same in a set position but withdrawable to permit the lever to be swung by said spring means about said pivot while the latter is stationary, means actuated by the motor for effecting movement of said pivot away from said limiting position and then toward such position whereby to swing the lever first about a fulcrum remote from said latch and thereby reset the latter and then allow the remote end of the lever to swing about said latch toward its limiting position, a switch controlling said motor arranged to be actuated from the end portion of said lever remote from said latch so as to be opened and closed respectively upon withdrawal of said latch and pivoting of the lever about the latch, and a brake for said motor arranged to be released and applied respectively by said lever in the switch-closing and switch-opening movements thereof, said brake, when applied, acting to arrest the motion of said lever short of said limiting position whereby the brake is held set by said spring means.

22. The combination with an electric motor of a lever having three fulcrums and supported on a pivot constituting one of said fulcrums and adapted for shifting movement to permit the lever to swing about the other fulcrums, manually controllable means for releasing said lever for movement about said pivot, means actuated by the motor for shifting said pivot to swing said lever on another of said fulcrums and in a direction to recondition the lever for control by said manually controllable means, means for subsequently effecting movement of said lever about the third fulcrum, and control means including a switch arranged to be actuated to start the motor in the movement of said lever about said pivot and to stop the motor in the movement of the lever about said third fulcrum.

23. The combination with an electric motor and a part to be actuated thereby through successive operating cycles in opposite directions, of means providing a pivot which is shiftable toward and from a limiting position, a lever mounted intermediate its ends to swing on said pivot, constantly acting means tending to swing said lever about said pivot and also to move the pivot into said position, a latch associated with one end portion of said lever and adapted to releasably hold the same in a set position, an electromagnet adapted when energized to withdraw said latch and permit the lever to swing about said pivot while the latter is stationary, a control element arranged to be moved alternately in opposite directions as an incident to the movements of said part in successive operating cycles, said element in each of its movements acting to reset said latch by moving said pivot away from limiting position and then to release said pivot to permit the lever to move about the latch as a fulcrum, a switch controlling the starting and stopping of the motor in each cycle, said switch being actuated from the end portion of said lever opposite said latch so as to be closed upon withdrawal of the latch and opened as the lever fulcrums on the latch, and a second switch controlling the direction of rotation of said motor upon closure of said first switch and arranged to be actuated by the same means as said control element so as to condition the motor circuits for reverse rotation of the motor in the succeeding cycle.

24. A power driven operator comprising, in combination, an actuating member adapted to be connected with a part to be moved in opposite directions in successive cycles, an electric reversible motor having a driving connection with said actuating member, a rock shaft operatively associated with said member so as to be turned in one direction or the other as the said member approaches either limit of its movement, a reversing switch operable to control the direction of rotation of the motor adapted to be actuated by said rock shaft, a second switch for controlling the energization of the motor to operate it in a direction determined by the reversing switch, a control lever carrying the movable contact of the second switch and mounted to turn on different fulcrums, spring means tending to move said lever in one direction about the different fulcrums, and two devices for releasing said lever to the action of said spring means, one of said devices being operable at will to effect the movement of the lever from a normal set position to close the said second switch and the other operable automatically by said rock shaft at the end of each operating cycle to effect the opening of said second switch.

In testimony whereof, I have hereunto affixed my signature.

HOWARD D. COLMAN.